(No Model.) 2 Sheets—Sheet 2.
P. L. SIMPSON.
PROCESS OF PREPARING CLAY.
No. 541,888. Patented July 2, 1895.
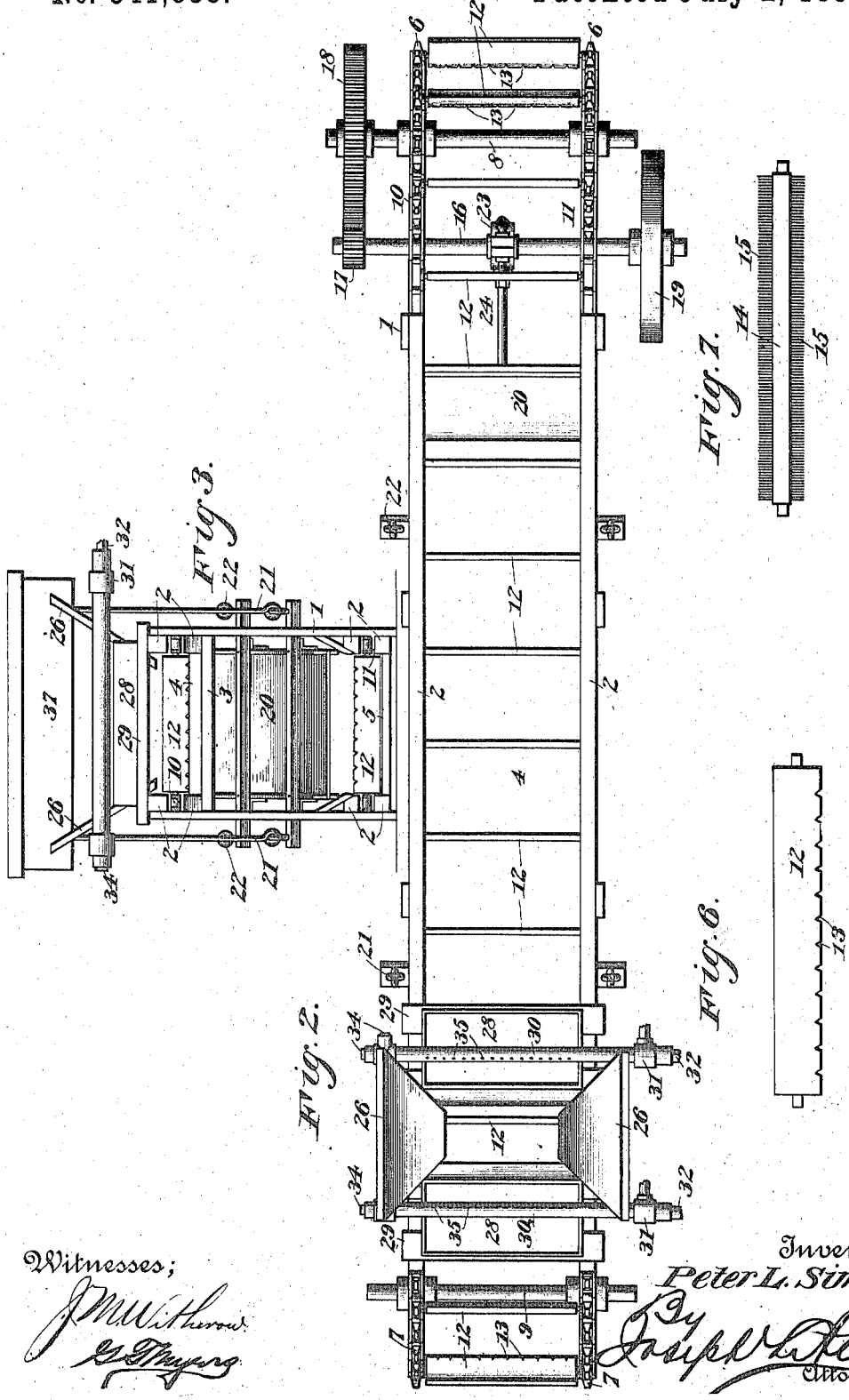
Witnesses:
J. M. Witherow
G. Myers
Inventor,
Peter L. Simpson,
By Joseph W. Atkins
Attorney

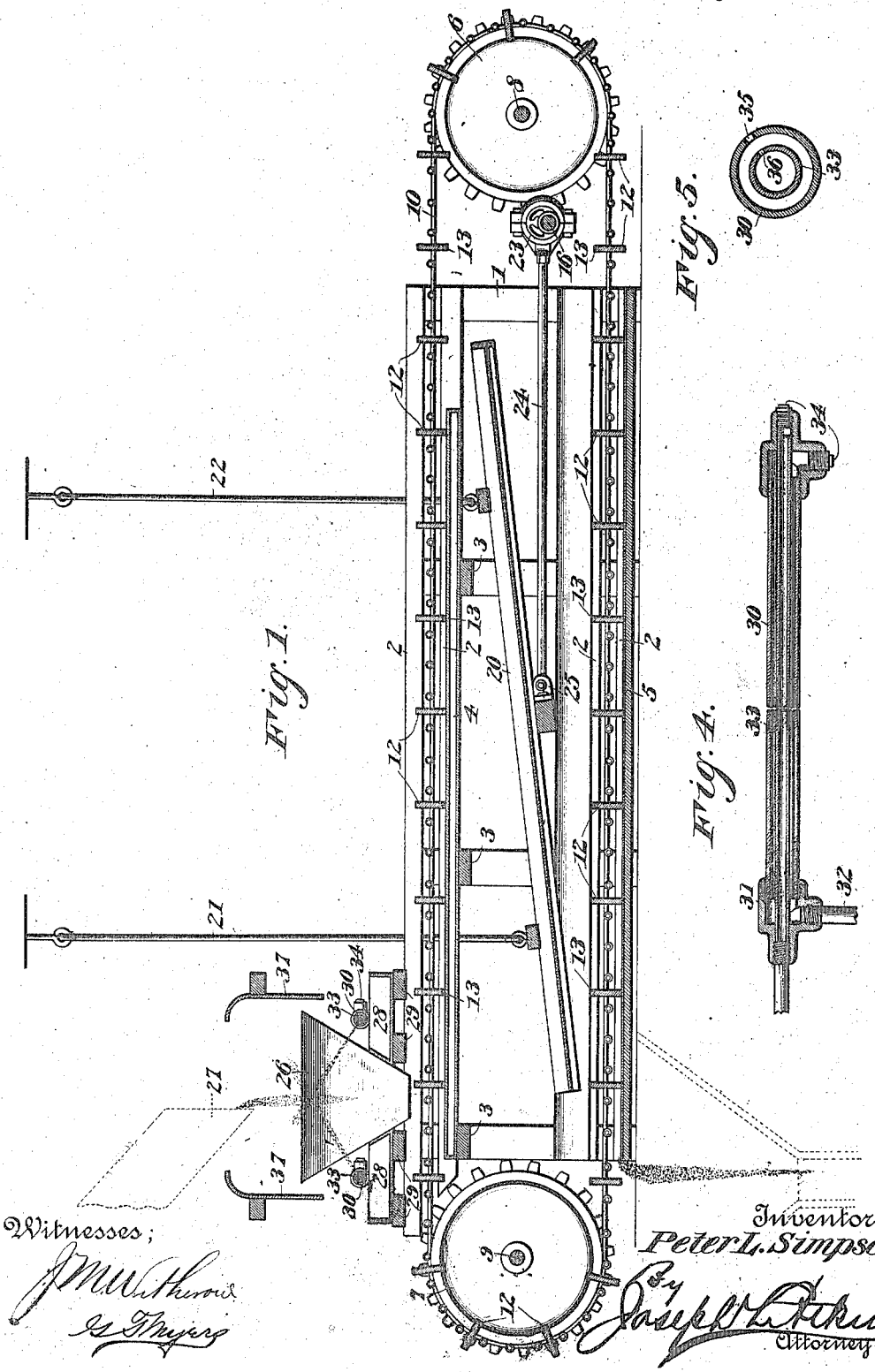

UNITED STATES PATENT OFFICE.

PETER L. SIMPSON, OF CHICAGO, ILLINOIS.

PROCESS OF PREPARING CLAY.

SPECIFICATION forming part of Letters Patent No. 541,888, dated July 2, 1895.

Application filed March 17, 1894. Serial No. 504,063. (No model.)

*To all whom it may concern:*

Be it known that I, PETER L. SIMPSON, of Chicago, in the county of Cook, State of Illinois, have invented a certain new and useful Process of Preparing Clay for the Manufacture of Brick or the Like and Apparatus for Carrying Out the Process, of which the following is a specification, reference being had to the accompanying drawings.

The object of my invention is to produce a process of rendering clay used in the manufacture of brick more plastic and homogeneous than by the process now in use, and also to produce improved mechanism for carrying out the process.

My process is especially applicable to prepare clay, shale rock, clay slates, fire clays, soapstone and other materials to be used in the manufacture of brick by the so called "dry" or "semi dry" processes.

In treating fire clays and shales during the pulverizing process, and previous to the introduction of the prepared material into the brick press, my invention is of especial merit.

In preparing shales, flinty fire clays and other hard clay material by the process now in use at present, the material is mined or taken from the bank, and when run through the crusher or dry pan it is altogether too dry to adhere together in the process of being pressed in the brick machine. To overcome the difficulty it is necessary to sprinkle the material with water in the dry pan so as to produce the ground material with the proper moisture. Owing to the sticky nature of the material this introduces the difficulty of diminishing the capacity of the dry pan or crusher by from fifty to seventy five per cent. In other words the wetting of the material on the dry pan has the effect of preventing the particles of clay material from falling through the grating or perforated bottom of the dry pan or crusher. As a matter of fact the material soon cakes over the perforations of the dry pan so as to entirely prevent the material from falling through, and causing the necessity of stopping the crusher or dry pan many times a day for the purpose of cleaning it. My invention entirely overcomes this difficulty inasmuch as the material is ground in as dry a condition as it may be found in the bank, and is furnished with the requisite moisture after it is ground and passed through the crusher.

By the process now in use, and which has been described, it is found that the moisture introduced to the material while being ground, especially when the material is of hard and flinty nature, such as most clays and shales, does nothing more than wet the outside of each particle of the material. Such moistening process is not only deficient in furnishing a good bond for the clay when under pressure in the brick press, but also prevents the brick from being homogeneous when baked. This objection is entirely overcome by my process and invention, inasmuch as each particle is dampened as it falls from the screen apparatus by a spray of hot water and steam, and is also subjected to the further process of each and every particle of material already wetted being heated and steamed by being passed slowly over a hot floor. By this action the particles are rendered moist and plastic all the way through, and made susceptible of adherence when under pressure in the brick machine.

Another very important factor in the manufacture of brick is now reached, inasmuch as each particle having been rendered plastic or semi plastic by my process, it vastly improves the quality of the brick. By my process the particles are squeezed into each other. In this way the quantity of brick turned out on the brick press is increased at least twenty-five per cent. The bricks are less subject to checking when undergoing burning in the kiln. They require less fuel to burn them; and when the bricks are required to be fully vitrified this point may be also obtained, which would be impossible with methods now in use at the present time in the manufacture of brick by the dry or semi dry process.

By my invention and process I therefore have improved the state of the art as follows: First, the capacity of the dry pan crusher is vastly increased; second, the capacity of the brick press is also vastly increased; third, the bricks made by my process require less fire to burn them; fourth, there is less waste in the kiln through defective burning, and fifth, the bricks are harder, stronger and more durable.

In the accompanying drawings: Figure 1 is a central longitudinal section of my apparatus designed to carry out my process. Fig. 2 is a top plan view thereof. Fig. 3 is an end elevation. Fig. 4 is a longitudinal section of steam and water supply pipes. Fig. 5 is a transverse section thereof. Fig. 6 is a side view of one form of flight, and Fig. 7 is a similar view of a brush flight.

Referring to the figures on the drawings: 1 indicates a frame which may be made of suitable material, and is firmly secured together so as to be perfectly rigid. It is preferably of an oblong or rectangular shape, as illustrated, and is provided, on its upper and lower sides, with longitudinal side pieces, two of the side pieces being provided on each side of the top and bottom of the frame, each pair being separated by a small space, as illustrated.

3 indicates cross pieces located near the top of the frame and designed to sustain a steam box 4. The steam box is preferably constructed of metallic plates, united together to form a steam tight receptacle. Steam is supplied from a source, not illustrated, in the usual manner employed for heating steam boxes. The particular connections employed for this purpose are not thought to be of sufficient importance to require illustration in detail.

By the aid of the steam the exterior of the box is kept at a temperature sufficient to generate steam from the water in contact therewith.

5 indicates a bottom floor carried in the frame. This floor may be a heating box corresponding with the box 4, but I deem it unnecessary, in ordinary use, to employ more than the one box.

For keeping the clay, which is, in practice, discharged upon the top of the steam box, in motion, I employ suitable clay driving mechanism, as for example, that illustrated, and of which—

6 and 7 indicate, respectively, a pair of sprocket wheels carried at each end of the frame on shafts 8 and 9 respectively. These shafts are supported in suitable bearings, (not illustrated) and are designed to carry sprocket chains 10 and 11 on opposite sides of the frame. The distance between each of the wheels 6 and 7, respectively, is such that the chains 10 and 11 are brought in the space between the side pieces. Upon these chains, and extending from one to the other, I secure, at suitable intervals, flights 12. These flights are so adjusted that by the movement of the chains they are drawn along the top of the steam box, and brush or scrape it with one edge, and, after passing around the wheels 6, present their opposite edges in like manner to the top of the floor 5. For this purpose the flights are made double-edged. The edge which scrapes the box 4 is preferably provided with notches 13, the notches in one of the flights being located so as not to come opposite that of its neighbor. By this arrangement a more thorough mixing of the material upon the top of the steam box may be effected.

It is unnecessary, in practice, to have the opposite edges of the flights notched, unless, as suggested, the floor 5 is converted into a steam box.

Instead of solid flights I may employ brush frames 14 provided with metallic brushes 15, as shown in Fig. 7 of the drawings, if preferred.

16 indicates a shaft carried in suitable bearings and at a proper distance from the shaft 8, provided with a pinion 17 at one end, meshing with a gear 18, the pinion and gear being secured, respectively, to the shafts 16 and 8. Upon the end of the shaft 16, opposite the pinion 17, is secured a belt pulley 19 adapted to derive power from a suitable source. (Not illustrated.)

20 indicates a screen suspended from the swinging supports 21 and 22, designed to be secured, at their upper ends, to the beam of a building, for example. (Not illustrated.) The swinging screen is supported on an incline, as illustrated. An eccentric 23, secured to the shaft 16, actuates a pitman 24 pivoted at its opposite end to a block 25, securely fastened to the bottom of the swinging screen.

26 indicates hopper ends secured to the frame 1 and designed to guide the discharge of clay from a chute 27 to the top of the steam box 4.

28 indicates sheet iron pans, or the like, secured upon cross pieces 29 above the frame 1, upon opposite sides of the hopper ends 26. They are designed to catch the drip from the pipes 30 secured above them. The pipes 30 are screwed into a fitting 31 shown clearly in Fig. 4 of the drawings and receive water from a pipe 32.

33 indicates a steam supply pipe screwed into the fittings 31 within the pipe 30, and adapted to receive steam from a suitable source of supply. The ports of the fitting 31 at the end of the pipes opposite the source of supply, are closed as by plugs 34. The pipes 30 and 33 are provided with a row of apertures 35 and 36 which are preferably drilled into them when the parts are assembled. The row of holes is located so that, in practice, they discharge obliquely between the hopper ends 26. As illustrated, two sets of pipes 30 are employed, one upon each side of the hopper ends, and they are arranged so that, in practice, their jets cross each other on the medial line of the hopper ends. Steam being admitted into the pipe 33, the water in the pipe 30 is broken into a spray and the commingled spray of steam and water is discharged against the clay as it descends from the chute 27, thus saturating it and at the same time materially raising its temperature.

Sheet metal aprons 37 are preferably suspended on opposite sides of the hopper ends to receive such portion of the sprays as pass the descending sheet of clay. These aprons are suspended above the pans 28 so that the objectionable accumulation of water around the machine is avoided.

My process consists of thoroughly wetting the clay and then subjecting it to the thorough action of steam. The preferable mode of accomplishing this result is to generate steam from the water with which the clay is saturated. In that way, I am able to thoroughly treat the entire mass of clay with the steam, the steam being generated in the body of the mass itself and at the same time expel the excess of moisture.

In carrying out the process by my machine, clay is dropped from the chute 27 between the hopper ends, in passing whither it is saturated by the sprays discharged from the pipes 30, in the manner above described. Its temperature is thereby materially raised so that its condition is favorable to the performance of the remaining steps of the process. In this condition it falls upon the top of the steam box 4, and on the top of which it is gradually passed by the flights until it drops upon the screen 20. During its passage over the top of the box 4, the moisture in the clay is converted into steam, which, under the conditions of its generation, thoroughly permeates the mass of clay. The effect thereof is, as above suggested, to render the mass homogeneous throughout. The finer particles of the clay deposited in the screen 20 fall through the same and are dropped upon the floor 5, and quickly discharged therefrom for use.

If a longer treatment of the clay is required, which is possible with certain qualities of material, the screen 20 may be entirely dispensed with, so that the clay, as it drops from the box 4 falls directly upon the floor 5. The floor 5 may, as above suggested, be constituted into a steam box corresponding to the box 4, and in that way the time of the steaming process may be doubled.

So far as my invention relates to the apparatus for carrying out my process, I do not limit myself to the details of construction shown and described, but reserve the right to modify and vary them at will within the scope of my invention.

What I claim is—

1. The process of treating clay for the manufacture of brick, which consists in first saturating the clay with water and second in generating steam within the mass from the water previously supplied, thereby causing it to effectually permeate the entire mass, substantially as and for the purpose specified.

2. The combination with a frame, steam box, and clay driving mechanism, of a swinging screen carried under the steam box, substantially as specified.

3. The combination with a frame, steam box and clay driving mechanism, of a shaft and sprocket wheels thereon, chains on the sprocket wheels, and flights carried on the chains, a driving shaft geared to one of the sprocket wheel shafts, a swinging screen under the steam box, a pitman connected therewith, and an eccentric on the driving shaft adapted to actuate the pitman, substantially as set forth.

4. The combination with a frame and oppositely discharging spray mechanism, of a steam box, and clay driving mechanism, substantially as set forth.

In testimony of all which I have hereunto subscribed my name.

PETER L. SIMPSON.

Witnesses:
G. T. MYERS,
LOUIS G. JULIHU.